United States Patent [19]

Altemose, Jr.

[11] 4,091,656
[45] May 30, 1978

[54] DETONATION ANALYZER FOR PISTON ENGINE

[75] Inventor: Arthur L. Altemose, Jr., Williamsport, Pa.

[73] Assignee: Avco Corporation, Williamsport, Pa.

[21] Appl. No.: 796,396

[22] Filed: May 12, 1977

[51] Int. Cl.² .............................................. G01L 23/22
[52] U.S. Cl. ...................................................... 73/35
[58] Field of Search ............................................ 73/35

[56] References Cited

U.S. PATENT DOCUMENTS

| | | | |
|---|---|---|---|
| 2,518,427 | 8/1950 | Lindberg et al. | 73/35 X |
| 2,534,276 | 12/1950 | Lancor | 73/35 |
| 2,607,215 | 8/1952 | DeBoisblanc | 73/35 |
| 2,964,939 | 12/1960 | Forrest | 73/35 |

Primary Examiner—James J. Gill
Attorney, Agent, or Firm—Robert J. McNair, Jr.; Irwin P. Garfinkle

[57] ABSTRACT

An analyzer adapted to be mounted in a operable aircraft and including an oscilloscopic display of the detonation characteristics of each cylinder of an internal combustion engine. The signal input to the oscilloscope is derived from vibration sensors attached to the engine spark plugs. The synchronizing signal input to the oscilloscope is derived from pulses generated at the primary circuit of the engine magneto. Solid state electronic circuits are used throughout and switching provides the capability to separately study the characteristics of each cylinder.

6 Claims, 4 Drawing Figures

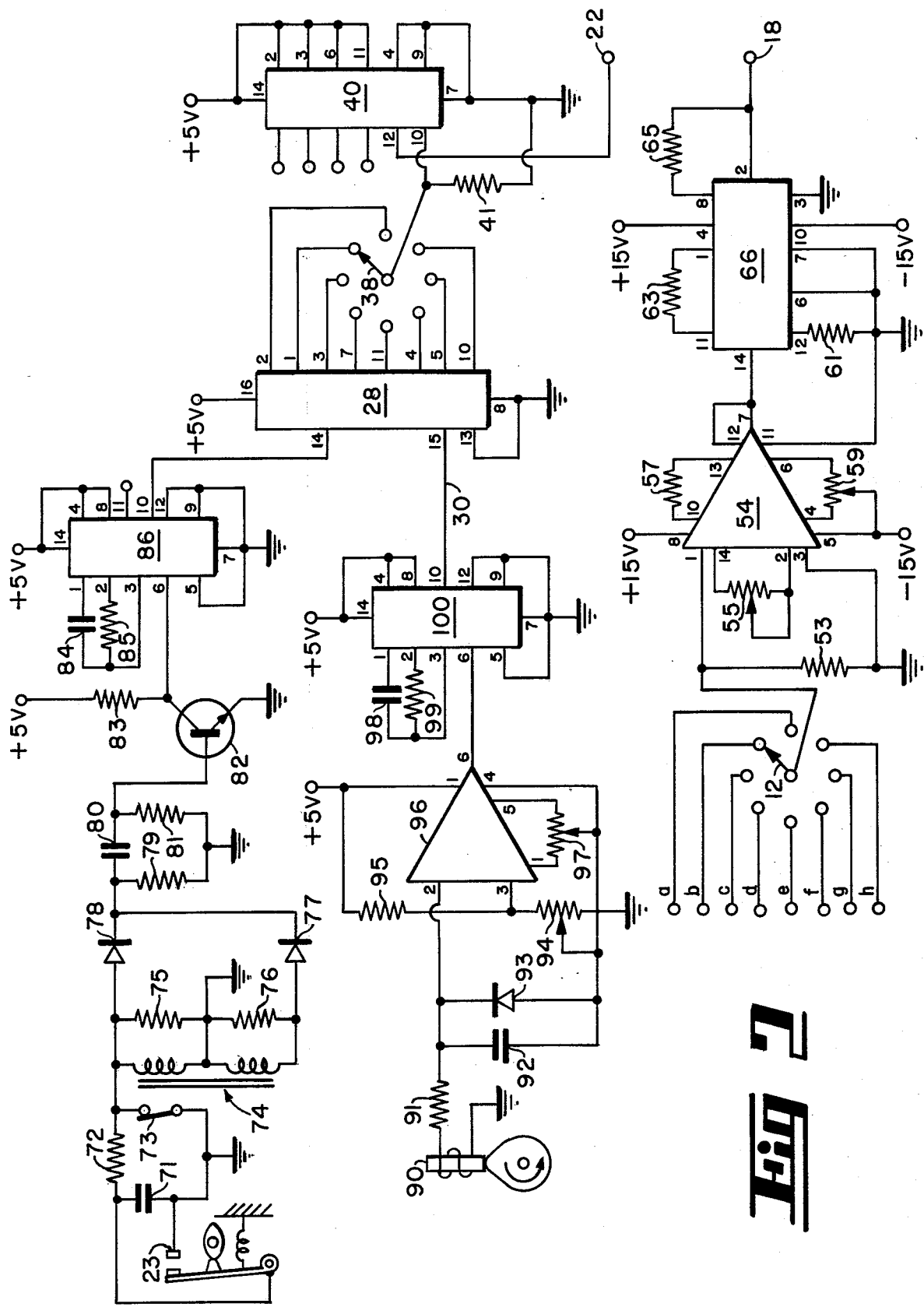

DETONATION ANALYZER FOR PISTON ENGINE

BACKGROUND OF THE INVENTION

Detonation or combustion knock in an internal combustion engine is the spontaneous combustion of a major portion of the air-fuel charge in the cylinder. Detonation results in an extremely rapid local pressure rise and produces a sharp metallic sounding knock. Detonation is caused by three things, namely; the auto ignition temperature of the air-fuel mixture, the ignition lag and the flame speed propagation within the mixture. The detonation phenomenon is usually investigated in the laboratory. One method of inhibiting detonation is by the use of an enriched fuel mixture. Using a 10 percent enriched fuel-to-air mixture provides an improved margin of safety while at the same time does not seriously degrade the fuel economy of the engine. The shape of the combustion chamber and the placement of the valves and the spark plug also effects the detonation characteristics of the engine.

Aside from the mechanical design and the fuel-to-air mixture there is significant influence on the detonation characteristics of an engine due to the environmental conditions in which it operates. This includes both the air temperature and the barometric pressure. With the increasing use of turbocharger equipped general aviation aircraft flying at altitudes up to 30,000 ft., it has become necessary to investigate the detonation characteristics of aircraft engines under environmental conditions which are not practical to duplicate in the laboratory. Available laboratory instruments are not considered suitable for applications in flying aircraft. This is primarily due to the relatively large size, heavy weight and high power consumption of existing laboratory instruments. In addition, laboratory instruments are not designed to function at 20,000 ft. altitudes wherein only 5 percent or less of the sea level air pressure remains.

Two systems for investigating the detonation characteristics of an engine are known. The first system was developed about 35 years ago specifically for commercial aircraft. The system consisted of several subassemblies which were permanently installed in the aircraft and the results monitored by the flight engineer. With the advent of jet powered commercial aircraft this system became obsolete and has been out of production for many years. The second system, also no longer in production, was developed for the conduct of both laboratory and flight investigations of the detonation phenomenon. This system had a very definite arcing problem when called upon to operate at altitudes above 20,000 ft. This second system also required considerable space and electrical power drain from the aircraft.

My invention overcomes the shortcomings of the two earlier systems. As reduced to practice my invention comprises an analyzer and a display unit which in combination weigh approximately 10 lbs. and occupy approximately one-third of a cubic ft. of volume.

BRIEF SUMMARY OF THE INVENTION

Using the principles of my invention, analysis of the detonation characteristics of an engine is accomplished as follows. The vibrations within each cylinder are monitored by a sensor which generates an electrical analog of the detonation vibrations. By means of a rotary switch the vibration signal from one of the engine's cylinders is selected. The selected signal is then amplified and filtered to enhance the frequency characteristics associated with the detonation phenomenon. The amplified and filtered signal is then injected into the input terminal of an oscilloscope to generate a visual display of the vibrations associated with detonation. In a separate channel a pulse wave train is derived which relates the angular position of the engine crankshaft and the firing pulses going to the spark plugs. By combining the firing pulses to the spark plugs and information obtained from a timing generator sampler, a signal is derived which yields a pulse that is coincident with ignition in the same cylinder that was selected for vibration analysis by the previously mentioned rotary switch. This pulse then serves as a synchronizing input to the oscilloscope.

The sensors are self-generating magneto-restrictive devices which clamp to the shell of each engine spark plug. The electronic circuitry in the unit reduced to practice was of solid state design. The oscilloscope was a small, compact and rugged portable instrument designed for applications up to 30,000 ft. of altitude. It was powered by integral rechargeable batteries. The entire analyzer assembly weighed less than 10 lbs.

DESCRIPTION OF THE DRAWINGS

FIG. 2 is a circuit diagram of the analyzer.

PREFERRED EMBODIMENT OF THE INVENTION

Figure 1:
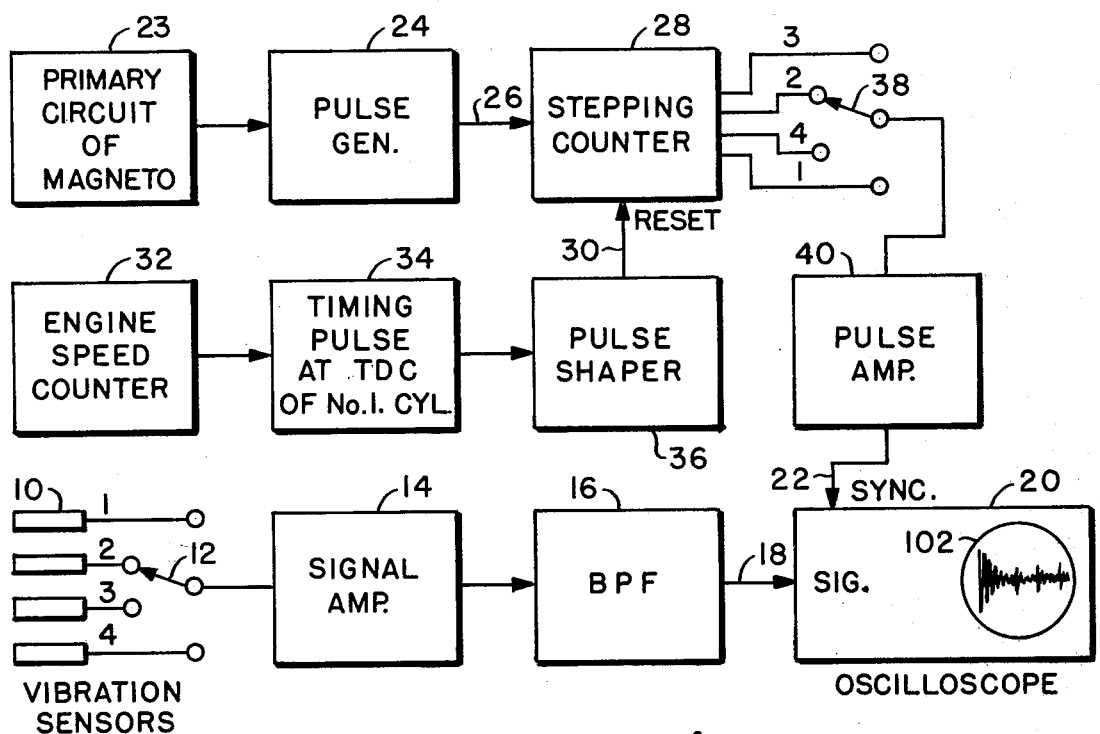
FIG. 1 is a block diagram of the analyzer showing signal sources and the rotary switch used to select an output from one of the vibration sensors mounted on each cylinder.

FIG. 1 shows a block diagram of the analyzer. A vibration sensor 10 is clamped to the shell of each spark plug of the engine. In the unit reduced to practice vibration sensor 10 was a magnetostrictive device built by Sperry Flight Systems having part number 610956. There are as many vibration sensors as there are cylinders in the engine. The FIG. 1 showing would be for a four cylinder engine. Rotary switch 12 selects the cylinder whose detonation characteristics are to be analyzed.

The electronic replica of the vibrations going on within the cylinder are amplified by signal amplifier 14. The output of amplifier 14 is passed through a bandpass filter 16 and is injected into signal input 18 of oscilloscope 20. The synchronizing signal 22 for oscilloscope 20 is generated as follows. The primary circuit of the engine magneto 23 is sampled. It will be understood that a pulse is generated in the primary circuit of an engine magneto every time that a cylinder ignites. The output of primary circuit 23 serves to trigger pulse generator 24 generating a pulse on line 26 each time the engine fires. A pulse on line 26 advances stepping counter 28 by one position. If the engine to which the analyzer is attached has a firing sequence of 3-2-4-1 the output of stepping counter 28 would be as shown in FIG. 1. Secondly, a timing source within the engine is sampled to provide an engine speed count 32. For example, the timing source might be obtained from the tachometer output shaft of the engine. The goal is to obtain a timing pulse 34 which coincides with the time when number 1 cylinder is at top dead center (TDC). This pulse is shaped in shaper 36 and used for generating a reset pulse 30 for use in returning stepping counter 28 to its start position. Start position as exemplified in FIG. 1 would signify number 3 cylinder. Rotary switch 38 would be set at the same cylinder position as switch 12. (Cylinder 2 as shown in FIG. 1). The pulse out of the stepping counter is amplified by pulse amplifier 40 to a level adequate for insertion into the sync input 22 of oscilloscope 20. A synchronizing pulse generated in this manner assumes a steady and uniform display, allowing easy and accurate identification of the detonation characteristics on oscilloscope 20.

Figure 3:
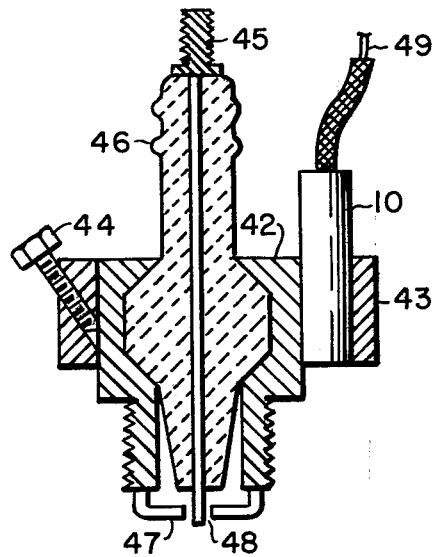
FIG. 3 is a cross-sectional view showing a vibration sensor clamped to the shell of a spark plug.

One of the vibration sensors 10 is shown clamped to an engine spark plug in FIG. 3. There sensor 10 is shown as being clamped to shell 42 of the spark plug by means of collar 43. Collar 43 is shown as being held in position by stud 44. It will be understood that the clamping of collar 43 to the shell of the spark plug may be accomplished in many ways and the use of stud 44 is intended only to indicate one means of making the attachment. In cross-sectional view the spark plug consists of center electrode 45 positioned within shell 42 by means of porcelain insulator 46. Ground electrode 47 provides a spark gap 48 across which the gases within the engine cylinder are ignited. Conductor 49 connects the electrical signal from sensor 10 to one of the terminals on switch 12 (shown in FIG. 1).

FIG. 2 shows a detailed circuit diagram of the electronics used in the analyzer. Several leads a, b, -, h show the terminal connections between the vibration sensors and the rotary switch 12. The center terminal of rotary switch 12 provides a means for conducting the selected vibration sensor signal to the input of amplifier 54. (It should be noted that the numerals from 1 through 16 which surround the periphery of each integrated circuit module signifies the lead connections coming from the module). Resistor 53 across the input of the amplifier 54 provides a matching load resistance. Variable resistor 53 is used for gain adjustment. Resistors 57 and 59 provide feedback compensation. In the unit reduced to practice amplifier 54 was a linear integrated circuit amplifier having a nomenclature AD 521. The amplified signal output from amplifier 54 is used as the input to bandpass filter 66. In the unit reduced to practice amplifier 66 was a universal active filter having a nomenclature UAF 31. In this integrated circuit, active filter resistors 61, 63 and 65 provide a means for controlling the bandpass characteristics of the filter. The specific values of these resistors are selected to enhance the frequency characteristics of the detonation vibrations within the cylinder of the engine. The amplified and filtered signal information appears at terminal 18 in the FIG. 2 diagram.

The primary circuit 23 of the magneto is shown by means of the breaker point and cam arrangement of FIG. 2. The breaker points open and close each time a spark is initiated in the cylinder of the engine. This opening and closing creates an electromagnetic signal across capacitor 71. Under operating conditions, when it is desired to use the analyzer, switch 73 will be open allowing the primary pulses from the magneto to pass through resistor 72. With switch 73 open, the primary voltage of the magneto is fed to a full wave rectifier circuit consisting of inductor 74, resistors 75 and 76 and diodes 77 and 78. Resistor 72 in addition to limiting the load applied to the magneto, forms a voltage dividing network in combination with resistors 75 and 76. This network is sized to provide the proper voltage amplitude for clamping and peak signal detection by transistor 82. Inductor 74 transforms the voltage from the magneto into two 180° phase-related voltages that enable detection of the alternate polarity pulses emanating from the magneto. Coupling capacitor 80 together with resistors 79 and 81 provide the proper impedance transfer from the diode detectors to the base of transistor 82. Current through transistor 82 is controlled by resistor 83.

The negative-going voltage peaks at the collector of transistor 82 are further shaped by means of a low power monostable multivibrator 86. This pulse shaping which is input controlled by the values of capacitor 84 and resistor 85, provide a pulse having the fast voltage rise needed for injection into stepping counter 28. In the unit reduced to practice multivibrator 86 had the nomenclature CD 4047 and stepping counter 28 had the nomenclature CD 4022.

The reset pulse for stepping counter 28 is generated as follows. A timing pulse is generated by variable reluctance pickup coil 90. This pulse can typically be obtained from an engine mounted timing generator which derives its signal from the tachometer output shaft of the engine. The timing signal is positioned such that the pulse occurs every other time the engine passes top dead center on number-1 piston. A pulse occurring at this position of a crankshaft passes resistor 91 and is injected into the inverting input of operational amplifier 96. The pulse amplifying characteristics of amplifier 96 are controlled by resistors 94, 95 and 97, clamping diode 93 and capacitor 92. The pulse from operational amplifier 96 serves as an input to multivibrator 100. In the unit reduced to practice multivibrator 100 was identical with multivibrator 86 and operational amplifier 96. It had the nomenclature CA 3130. The output pulse on pin 10 of multivibrator 100 serves as the reset signal 30 for stepping counter 28. Capacitor 98 and resistor 99 help to establish the rise-time characteristics of multivibrator 100.

Stepping counter 28 is shown as having eight outputs, one for each of the terminals on rotary switch 38. With stepping counter 28 having eight possible outputs the analyzer can be used for either 4, 6, 7 or 8 cylinder engines. When testing a 4 cylinder engine having a firing sequence of 1-3-2-4, reset pulse 30 will recycle stepping counter 28 to its initial position after a count of 4. For an 8 cylinder engine having a firing sequence of 1-8-4-3-6-5-7-2, stepping counter 28 will be recycled to its initial position after a count of 8.

Switch 38 in FIG. 2 is shown as being a simple, one pole 8 position rotary switch. In the unit reduced to practice switch 38 was more complex in that provision was made for accommodating aircraft engines which rotated in both a clockwise and a counterclockwise direction. This accommodation is needed because of the fact that twin engine aircraft have engines rotating in different directions on opposite sides of the fuselage. This is done to counter a tendency for the airplane to dip down on one wing if both engines rotate in the same direction. The position of switch 38 is set such that it will receive a timing pulse that is coincident with the vibration sensor position selected by rotary switch 12. This means that there will be a pulse on the output of switch 38 once per every 720° rotation of the engine crank for a 4-stroke cycle engine. This pulse will appear across resistor 41 and serve as the input at pin 10 of pulse amplifier 40. In the unit reduced to practice pulse amplifier 40 had the nomenclature CD 4007. Pin 12 of amplifier 40 serves as the output and provides the synchronizing signal 22 for use in the display unit.

Figure 4:
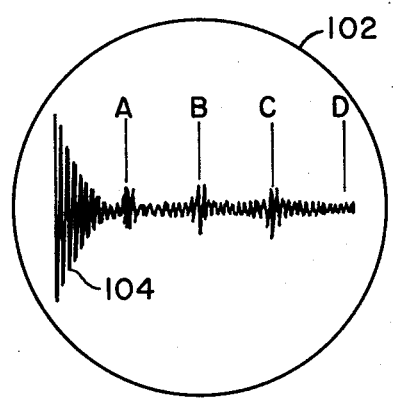
FIG. 4 is a replica of a typical detonation signal as it appears on the display screen of the oscilloscope.

FIG. 4 shows a typical display as it would appear on cathode ray tube 102 of oscilloscope 20. A typical detonation signal will appear as trace 104 on tube 102. At the left hand side of the display which represents ignition within the cylinder, trace 104 will appear as a damped sine wave. At position A there will be a slight increase in the magnitude of the signal. This is due to the opening of the exhaust valve within the cylinder. At position B there is another increase in signal strength. This is due to the closing of the exhaust valve and the opening of the intake valve. The intake valve will close at or near the 540° point on the crankshaft which is designated by the letter C. After two complete revolutions of the crankshaft (Position D) the engine cylinder will again be ready for ignition. Initiation of the detonation signal will occur from 15° to 30° before top dead center of the piston on an engine operated at or near rated rpm. Predetonation of the charge within the cylinder due to low octane rating of the fuel will cause the magnitude of the signal wave 104 to increase.

Power to operate the circuitry shown in FIG. 2 was supplied by four small C size batteries. The batteries were connected directly to the integrated circuits shown as requiring a supply voltage of 5 volts. The integrated circuits requiring a supply of 15 volts obtained their power from a DC to DC converter connected across the four battery cells.

In summary then, the synchronizing output signal 22 is derived from the combination of signals from the magneto and a timing source. Basically, the timing source produces voltage pulses which occur during the interval between the firing of number 1 cylinder and the firing of the next cylinder in the sequence. This large timing tolerance results in an easily performed task which can be accomplished by a mechanical generator design. The precise time the detonation vibration pattern begins is established by the magneto pulse which normally occurs from 15° to 20° before the piston reaches top dead center. For this reason the timing pulse was selected to occur at top dead center of number 1 cylinder since this point is readily determined by a calibration mark on almost all piston engines. A shaped pulse, generated as a result of the occurence of top dead center on number 1 cylinder, then resets stepping counter 28 to the next cylinder in the firing order sequence occurring after number 1 cylinder.

The stepping counter 28 (see FIG. 2) receives conditioned pulses from the magneto at the engine firing rate. These pulses sequentially step counter 28 through its 8 output lines. That is, the first pulse after reset will cause output line 2 to change voltage state from 0 to 5 volts positive while the 7 other lines remain at 0. The next pulse received from the magneto will cause line 2 to revert to the 0 state and line 1 to change to 5 volts. This process continues until all lines, that is module pins 2-1-3-7-11-4-5-10 have had a voltage transistion. If the engine under test has less than 8 cylinders, a reset pulse 30, entering module pin 15 will reset counter 28 to its ititial state whenever piston 1 of the engine reaches top dead center. As an example, consider a 4 cylinder engine such as was depicted in FIG. 1. Assume this engine has a firing order of 1-3-2-4, an ignition timing of 20° before top dead center, and a timing source set to provide a signal at top dead center of number 1 piston on the power stroke. With these conditions the stepping counter will reset after number 1 cylinder fires but before number 3 cylinder fires. Thus, the first decoded output pulse from stepping counter 28 (see FIG. 2) will always occur with the ignition of number 3 cylinder and this pulse will appear on pin 2 of stepping counter 28. The next decoded pulse will coincide with the ignition of number 2 cylinder and this pulse will appear on pin 1 of stepping counter 28. The next pulse will fire cylinder number 4 and this will raise the status of output pin 3 on stepping counter 28 to the 5 volt positive state. The 4th pulse from the magneto will fire cylinder 1 at an ignition timing of 20° before top dead center. This raises the status of pin 7 on stepping counter 28 to the positive state. Then, 20° later, the reset pulse will appear on pin 15 of stepping counter 28, resetting it to its initial state. The next pulse from the magneto will ignite number 3 cylinder and the sequence will be repeated.

The pulses on the output lines of the stepping counter 28 will be properly timed as they are transferred through switch 38 to provide synchronization pulses at line 22. Depending on the selection of corresponding positions of switches 38 and 12 the synchronization of the oscilloscope will be assured. The synchronizing feature of this analyzer assures a steady and uniform display on the oscilloscope, allowing accurate identification of the detonation characteristics.

It is to be noted that the numerals on the output lines of stepping counter 28 in FIG. 1 refer to the firing order sequence whereas the numerals on the output lines of stepping counter 28 in FIG. 2 refer to the output pins of the integrated circuit module.

While it has been shown what is presently considered to be the preferred embodiment of the invention, it will be understood by those skilled in the art that various changes and modifications may be made in the apparatus without departing from the proper scope of the invention.

I claim:

1. Apparatus for analyzing the detonation vibrations within each cylinder of an internal combustion engine having a rotating crankshaft, pistons connected thereto and spark plugs energized by a magneto for cyclically igniting the air-fuel mixture within each of said cylinders, said apparatus comprising:

a multiplicity of vibration sensors, one of said sensors being in contact with each cylinder of the engine being analyzed, each of said sensors providing an output signal that is an electronic replica of the vibrations going on within said cylinder;

a switch for selectively sampling the output of one of said multiplicity of vibration sensors;

first electronic circuitry means connected to the output of said switch means, said electronic circuitry means serving to amplify and filter the signal from the selected vibration sensor whereby the frequency band associated with the detonation phenomenon are amplified more than other frequencies;

an oscilloscope having a visual display and including a signal input terminal and a synchronizing pulse input terminal, said signal input terminal being supplied by the output from said first electronic circuit means; and second electronic circuitry means for generating a wave train of synchronizing pulses for injection into the synchronizing pulse input terminal of said oscilloscope, said second electronic circuitry means including:

a pulse generator connected to the output of said magneto and providing a conditioned output pulse each time said magneto ignites an engine cylinder, a stepping counter having as many outputs as there are cylinders in the engine, said counter receiving conditioned pulses from said pulse generator at the engine firing rate, a timing source producing a reset pulse in coincidence with the attainment of top-dead-center by the piston of number one cylinder of said engine, said reset pulse being used to return said stepping counter to its initial state, and a switch for selecting one of the outputs of said stepping counter, said selection being for the purpose of obtaining a synchronizing pulse input for said oscilloscope, said synchronizing pulses being coincident with the passing of ignition pulses to the cylinder spark plugs.

2. The apparatus as described in claim 1 wherein the oscilloscope is an instrument having the capability to function under reduced atmospheric pressure conditions equivalent to those found at 30,000 ft. altitude above mean sea level.

3. The apparatus as described in claim 1 wherein the first electronic circuit means includes a linear integrated circuit amplifier having an output serving as the input to a universal active filter of the integrated circuit type.

4. The apparatus as described in claim 1 and including self contained batteries for powering both first and second electronic circuitry means.

5. The apparatus as described in claim 1 wherein the vibration sensors are magnetostrictive devices.

6. The apparatus as described in claim 5 wherein each vibration sensor maintains contact with an engine cylinder through a clamp attaching said sensor to the shell of the spark plug used for igniting said cylinder.

* * * * *